United States Patent [19]

Tanaka et al.

[11] Patent Number: 5,488,219
[45] Date of Patent: Jan. 30, 1996

[54] INDUCTION HEATING COIL ASSEMBLY AND METHOD FOR HARDENING INNER SURFACE OF CYLINDER BY USING THE SAME

[75] Inventors: Yoshimasa Tanaka; Hisashi Tabuchi, both of Hiratsuka, Japan

[73] Assignee: Neturen Co., Ltd., Tokyo, Japan

[21] Appl. No.: 341,872

[22] Filed: Nov. 15, 1994

[30] Foreign Application Priority Data

Dec. 13, 1993 [JP] Japan ................................. 5-311941
Mar. 29, 1994 [JP] Japan ................................. 6-059229

[51] Int. Cl.⁶ .................................................. H05B 6/38
[52] U.S. Cl. ....................... 219/644; 219/675; 148/571; 266/129
[58] Field of Search ......................... 219/644, 675, 219/674; 148/570, 571; 266/129

[56] References Cited

U.S. PATENT DOCUMENTS 3,236,993  2/1966  Jones ........................... 219/675
3,980,853  9/1976  Morisaki ....................... 219/674
4,401,485  8/1983  Novorsky ...................... 219/644
4,625,090  11/1986 Pfaffmann et al. ............... 219/644

FOREIGN PATENT DOCUMENTS 58-73990   5/1983   Japan .

*Primary Examiner*—Philip H. Leung
*Attorney, Agent, or Firm*—Oliff & Berridge

[57] ABSTRACT

An induction heating coil for forming a hardened layer in the inner wall of an external cylindrical member to be heated is disclosed. On the inner wall of the conductive induction member, a plurality of recess portions are formed at predetermined spaces circumferentially. The portions of the inner wall of the external cylindrical member to be heated which are opposed to the recess portions can be separately heated, in order collectively to form a plurality of separate partial hardened layers in the inner wall of the external cylindrical member to be heated circumferentially.

16 Claims, 6 Drawing Sheets

INDUCTION HEATING COIL ASSEMBLY AND METHOD FOR HARDENING INNER SURFACE OF CYLINDER BY USING THE SAME

BACKGROUND OF THE INVENTION

1. Field of the Invention

The present invention relates to an induction heating coil assembly used for heating the inner wall of a cylindrical member to form a plurality of separate partial hardened layers circumferentially therein, and relates to a method for hardening the inner wall of a cylinder, in particular, the inner wall of a cylinder block, by using the induction heating coil.

2. Description of Related Art

Conventionally, "an induction heating coil assembly" used for hardening the entirety of the circumference of the inner wall of a cylindrical member to be heated is disclosed in Japanese Laid-Open Patent Publication No. Sho 58-73990 which was previously filed in Japanese Patent Office by the applicant.

The above conventional induction heating coil assembly comprises a plurality of wound conductive parts which are concentrically provided at equal spaces in the cylindrical member to be heated having a small diameter, in order concentrically to form a plurality of ring-shaped hardened layers which are vertically arranged, in the inner wall of the cylindrical member. The adjacent winded conductive parts of the induction heating coil assembly have winding directions reverse to each other. A core made of a magnetic substance is attached to each winded conductive part in order to concentrate alternative magnetic flux generated by each winded conductive part to only a predetermined area of the circumferential wall of the cylindrical member to be heated which is opposed to each winded conductive part.

Therefore, the hardening treatment using such an induction heating coil assembly forms a plurality of circumferential ring-shaped hardened layers in the inner wall of a cylindrical member to be heated having a small diameter, so that strain which was produced by a conventional method for hardening the entirety of the circumference of the inner wall is not produced in the inner wall. Thereby, an abrasion resistance is given to a predetermined inner wall of the cylindrical member with a small diameter.

However, as mentioned above, the conventional induction heating coil assembly has a complicated construction. Therefore, there is a problem that such a conventional induction heating coil assembly and such a conventional method for hardening the inner wall of a cylinder require large manufacturing costs.

The induction heating coil having such a construction can be utilized for only the purpose of forming a plurality of circumferential continuous ring-shaped hardened layers arranged vertically at equal spaces in the inner wall of a cylindrical member to be heated which has a small or large diameter. Therefore, there is another problem that such an induction heating coil assembly or the method for hardening an inner wall of a cylinder using such an induction heating coil assembly cannot respond to a requirement of dividing each circumferential portion to be heated of the inner wall of the cylindrical member into plural separate parts at desired positions and to a requirement of heat-treating collectively to form a plurality of separate partial hardened layers on a line of a circumferential ring on the inner wall.

Since the conventional induction heating coil assembly comprises a plurality of winded conductive parts, the induction heating coil assembly and the conventional method using such an induction heating coil assembly require a large electric power and it is difficult to control the electric power supplied to each winded conductive part constantly.

SUMMARY OF THE INVENTION

The present invention was developed in view of the above-described problems of the conventional induction heating coil assembly and the method for hardening an inner surface of a cylinder using such an induction heating coil assembly.

Therefore, an object of the present invention is to provide an improved induction heating coil assembly which can divide each circumferential portion to be heated of the inner wall of a cylindrical member, e.g., a cylinder block, into plural parts at desired positions and can easily heat-treat to form separate partial hardened layers collectively.

Another object of the present invention is to provide an improved method for hardening an inner wall of a cylinder by using such an improved induction heating coil assembly.

A further object of the present invention is to provide an improved method for hardening an inner wall of a cylinder block by using such an improved induction heating coil assembly.

Therefore, in accordance with one aspect of the present invention, the induction heating coil assembly comprises a conductive induction member having an approximately cylindrical shape, for forming a hardened layer in the inner wall of an external cylindrical member to be heated which is provided apart from the conductive induction member, by generating an induced current in the inner wall of the external cylindrical member, wherein a plurality of recess portions are formed on the inner wall of the conductive induction member at predetermined spaces circumferentially, so that portions of the inner wall of the external cylindrical member to be heated which are opposed to the recess portions can be separately heated, in order collectively to form a plurality of separate partial hardened layers in the inner wall of the external cylindrical member to be heated circumferentially.

Preferably, the conductive induction member has a coil construction with one turn. To each recess portion of the conductive induction member, a core may be attached so that alternating magnetic flux generated by the conductive induction member is concentrated upon the forward direction.

According to the present invention, portions of the inner wall of the external cylindrical member to be heated which are opposed to the recess portions are separately heated strong. Consequently, a plurality of separate partial hardened layers which are on a line of a ring can be collectively formed in the inner wall of the external cylindrical member to be heated circumferentially.

Therefore, it is possible to divide each circumferential portion to be heated on the line of the inner wall of the cylindrical member into plural parts at desired positions and to heat-treat collectively to form a plurality of ring-shaped separate partial hardened layers. Thereby, it is possible easily to respond to a requirement of a lot of types of pattern for hardening.

Since the induction heating coil assembly according to the invention has a simple structure, it is possible to reduce and easily control the quantities of electric current from a power supply apparatus, and to reduce the burden of power and control on the power supply apparatus, and thereby to cut cost for a system using the induction heating coil assembly. Therefore, it is also possible to suppress exhaustion of the induction heating coil assembly itself to lengthen life, and to reduce the maintenance costs thereof.

In accordance with one aspect of the present invention, the method for hardening an inner surface of a cylinder by using the above induction heating coil assembly comprising the steps of: flowing high frequency current through the conductive induction member at a first position thereof with respect to the external cylindrical member, to heat separate portions on a first circumferential line of the inner wall of the external cylindrical member which correspond to the plurality of recess portions of the conductive induction member by generation of induced currents in the inner wall of the external cylindrical member, and thereby to form a plurality of hardened layers at the separate portions on the first circumferential line; transferring the conductive induction member to a second position with respect to the external cylindrical member along the central axis of the external cylindrical member; and thereafter, flowing high frequency current through the conductive induction member at the second position thereof with respect to the external cylindrical member, to heat separate portions on a second circumferential line of the inner wall of the external cylindrical member which correspond to the plurality of recess portions of the conductive induction member by generation of induced currents in the inner wall of the external cylindrical member, and thereby to form a plurality of hardened layers at the separate portions on the second circumferential line.

In accordance with another aspect of the present invention, the above method for hardening an inner surface is applied to a cylinder block.

Preferably, the inner wall of the conductive induction member has m recess portions at approximately equal spaces circumferentially, and the steps of transferring the conductive induction member and of flowing high frequency current through the conductive induction member thereafter are repeated n times, so that [m×(n+1)] separate partial hardened layers are formed in the inner wall of the cylinder block.

Each of the methods of the present invention may further comprise a step of rotating the conductive induction member at a predetermined angle after the step of flowing high frequency current at the first position thereof.

According to the method of the present invention, when the inner wall of the conductive induction member has m recess portions at approximately equal spaces circumferentially, and the steps of transferring the conductive induction member and of flowing high frequency current through the conductive induction member thereafter are repeated n times, [m×(n+1)] separate partial hardened layers can be formed in the inner wall of the cylinder block.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Hereinafter, preferred embodiments of the induction heating coil assembly and of the method for hardening an inner surface of a cylinder, in particular, an inner surface of a cylinder block, according to the present invention will be explained with reference to the drawings.

FIGS. 1–8 show embodiments of the induction heating coil assembly according to the present invention.

Figure 1:
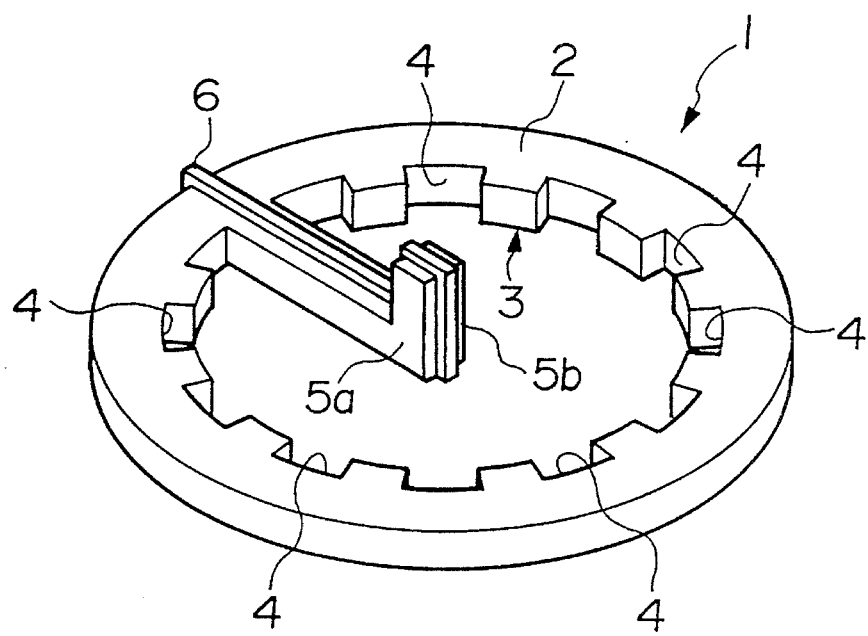
FIG. 1 is a perspective view of an induction heating coil assembly according to an embodiment of the present invention.

FIG. 1 is a perspective view of an induction heating coil assembly 1 (hereinafter, which is simply called "a coil assembly 1"). In this Figure, the coil assembly 1 comprises a cylindrical conductive member 2 and a pair of cable connecting portions 5a and 5b for connecting with a pair of cables for supplying current. The inner wall 3 of the conductive member 2 has a plurality of recess portions with a predetermined width, e.g., 12 recess portions 4, 4, . . . , which make the thickness of the conductive member 2 small partially, at approximately equal spaces circumferentially. The pair of cable connecting portions 5a and 5b are formed on a portion of the inner wall 3 of the conductive member 2. The pair of cables for supplying current are for connecting the cable connecting portions 5a and 5b with an inverter power supply apparatus which is provided outside the coil assembly 1.

Between the pair of cable connecting portions 5a and 5b, an insulating member 6 is sandwiched to form a heating coil with one turn.

Figure 2:
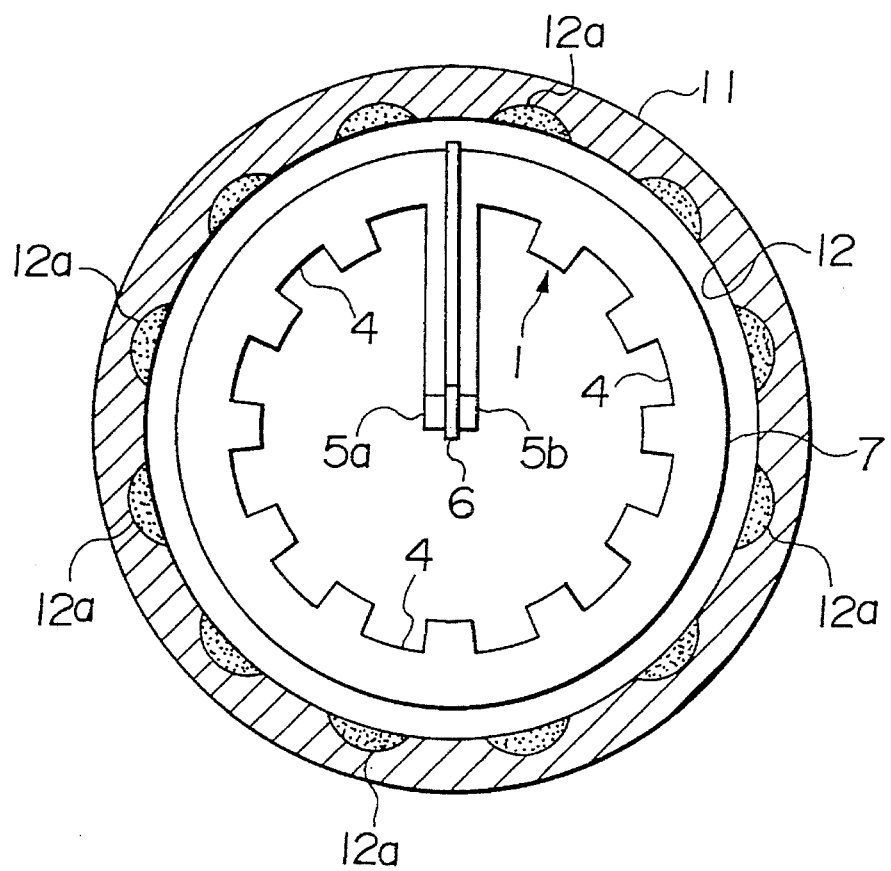
FIG. 2 is a transverse sectional view of a cylindrical member, e.g., a cylinder block, to be heated in which the heating coil assembly is set at a predetermined uniform space therefrom.

The coil assembly 1 in the embodiment is for collectively forming a plurality of separate partial hardened layers in the inner wall of a cylindrical member, e.g., a cylinder block, to be heated circumferentially. The coil assembly 1 is set in a cylinder block 11 to be heated with a predetermined uniform space from the inner wall 12 of the cylinder block 11, as shown in the transverse sectional view of FIG. 2. In FIG. 2, the cylinder block 11 is shown by a transverse section taken along the upper surface of the coil assembly 1. This Figure shows a state in which a plurality of separate partial hardened layers are formed at circumferential portions in the inner wall 12 of the cylinder block 11 to be heated which are opposed to the recess portions 4 of the coil assembly 1.

Figure 3A:
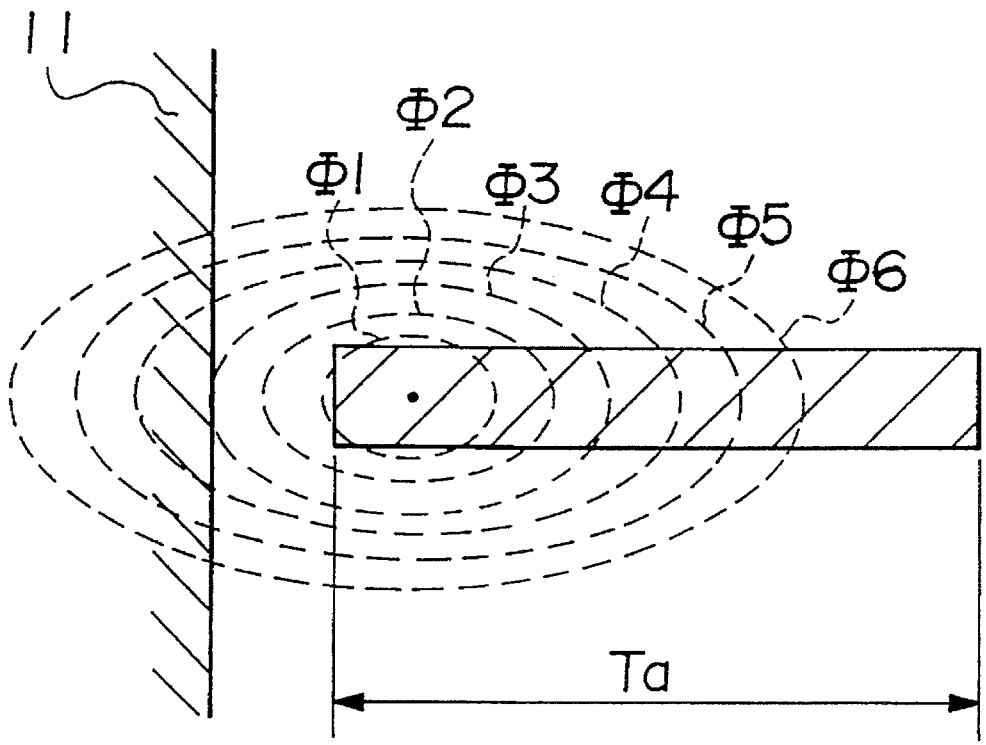
FIG. 3A is an enlarged vertical longitudinal sectional view taken on line 3A—3A of FIG. 4.
Figure 3B:
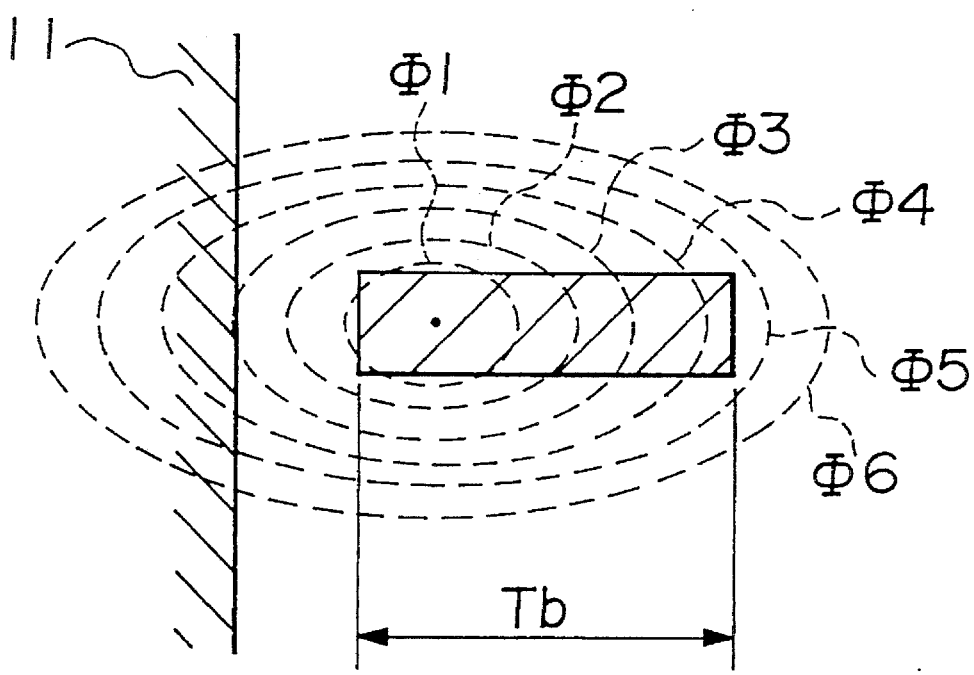
FIG. 3B is an enlarged vertical longitudinal sectional view taken on line 3B—3B of FIG. 4.
Figure 4:
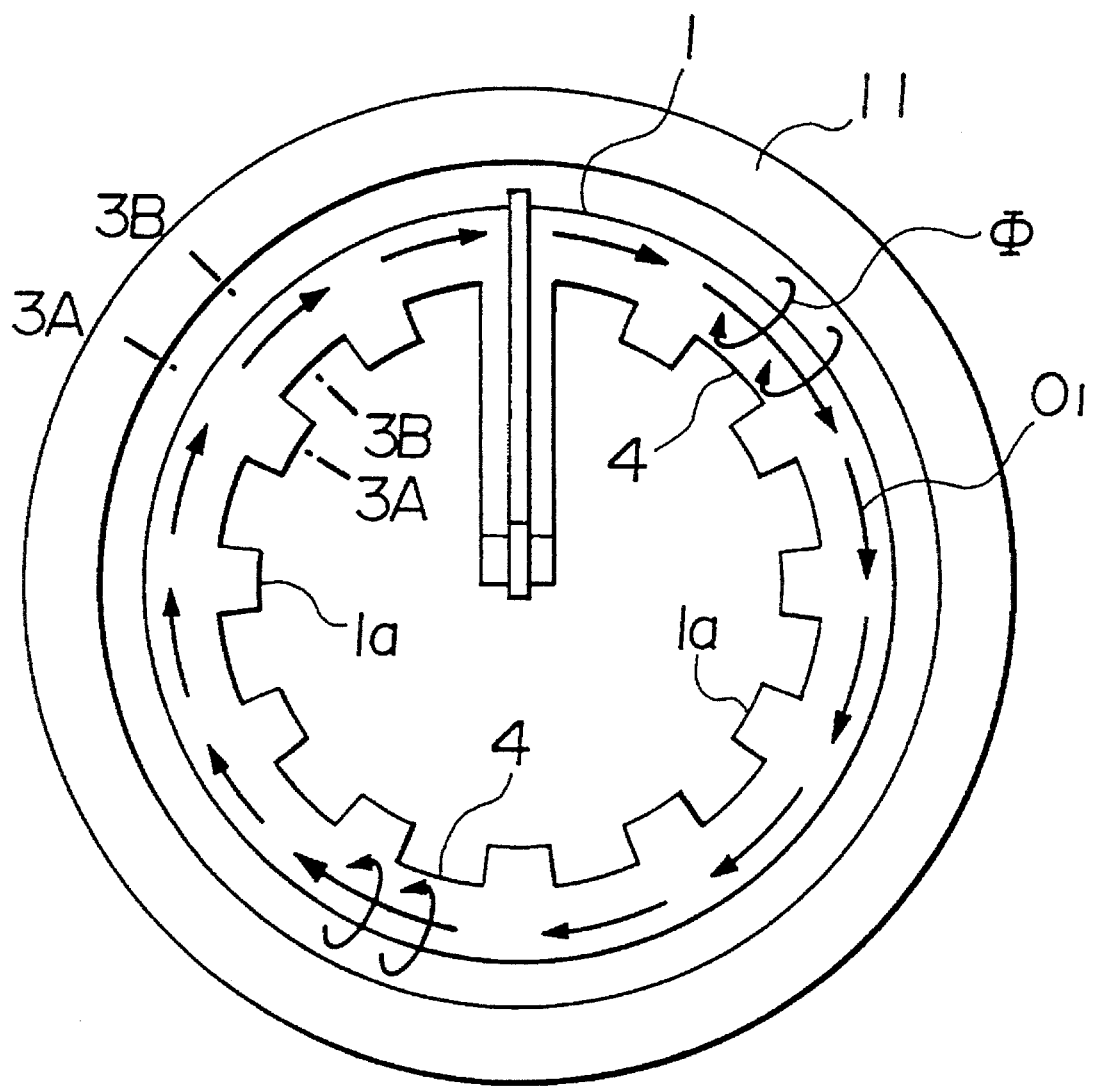
FIG. 4 is a plan view for explaining a state of alternating magnetic flux Φ generated between the induction heating coil assembly and the inner wall of the external cylindrical member to be heated.

FIG. 3A is an enlarged vertical longitudinal sectional view taken on line 3A—3A of FIG. 4, showing a part of the cylinder block 11 and a convex part 1a of the coil assembly 1. FIG. 3B is an enlarged vertical longitudinal sectional view taken on line 3B—3B of FIG. 4, showing a part of the cylinder block 11 and the recess portions 4 of the coil assembly 1. High frequency current flowing in the conductive member 2 has a property of flowing in the side near the cylinder block 11 to be heated, caused by the proximity effect which is a characteristic of high frequency current, as shown in FIGS. 3A and 3B. Therefore, high frequency current flows on a current path in the conductive member 2 which is in the side near the cylinder block 11, as shown in FIG. 4.

When the current path in the cylindrical conductive member 2 can be considered to be an imaginary path $O_1$ as shown in FIG. 4, the magnetic flux $\Phi$ generated by the current flowing through the cylindrical conductive member 2 is shown in FIGS. 3A and 3B. In these Figures, the density of the magnetic flux $\Phi 1$–$\Phi 6$ on the sections of 3A—3A is equal to that of the magnetic flux $\Phi 1$–$\Phi 6$ on the sections of 3B—3B. When the radial thicknesses of the cylindrical conductive member 2 on the sections of 3A—3A and 3B—3B are $t_a$ and $t_b$, respectively, the thickness $t_b$ is less than the thickness $t_a$.

The magnetic flux $\Phi$ generated by the high frequency current $O_1$ can be illustrated on the surface of the conductive member as shown in FIG. 4. When the cylindrical conductive member 2 has radial thicknesses $t_a$ and $t_b$, at the convex portion 1a and the recess portions 4, respectively, the magnetic flux $\Phi 5$ and $\Phi 6$ pass through the convex portion 1a of the conductive member 2 having the radial thickness $t_a$ so that these flux $\Phi 5$ and $\Phi 6$ cut the conductive member 2 vertically, as shown in FIG. 3A, however, the magnetic flux $\Phi 5$ and $\Phi 6$ pass outside the conductive member 2 having a radial thickness $t_b$, i.e., in the recess portions 4, as shown in FIG. 3B. The magnetic flux $\Phi 5$ and $\Phi 6$ passing through the convex portion 1a of the conductive member 2 produce a local heating of a portion of the conductive member 2. Consequently, the strength of the obtained flux $\Phi$ passing through the convex portion 1a having the radial thickness $t_a$ is smaller than that of the flux passing through the portion of the conductive member 2 having the recess portions 4, i.e., the portion having the radial thickness $t_b$. Thereby, the flux $\Phi$ passing through the convex portion 1a as shown in FIG. 3A makes small the proximity effect of induced current flowing in the cylinder block 11 to be heated. Consequently, the heating effect to the cylinder block 11 by the portion having the radial thickness $t_a$ of the conductive member 2 is less than that of the portion having the radial thickness $t_b$.

On the contrary, the strength of the flux passing the portion of the conductive member 2 having the recess portions 4, i.e., the portion having the radial thickness $t_b$, is larger so that the proximity effect of induced current flowing in the cylinder block 11 to be heated is large. Consequently, the inner wall of the cylinder block 11 to be heated which is opposed to the portion of the conductive member 2 having the recess portions 4, is strongly heated. Thereby, a plurality of separate partial hardened layers 12a can be collectively formed in the inner wall 12 of the cylinder block 11 to be heated circumferentially, as shown in FIG. 2. On the surface of the inner wall 12 of the heated and hardened cylinder block 11, 12 hardened layers 12a are circumferentially dividedly formed, as shown in a development elevation view of FIG. 5A.

Figure 5A:
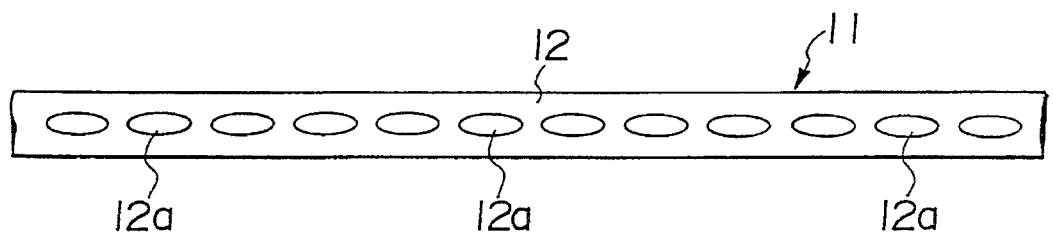
FIG. 5A shows a pattern of formed hardened layers in a development elevational view of the inner wall of the heat-hardened external cylindrical member.
Figure 5B:
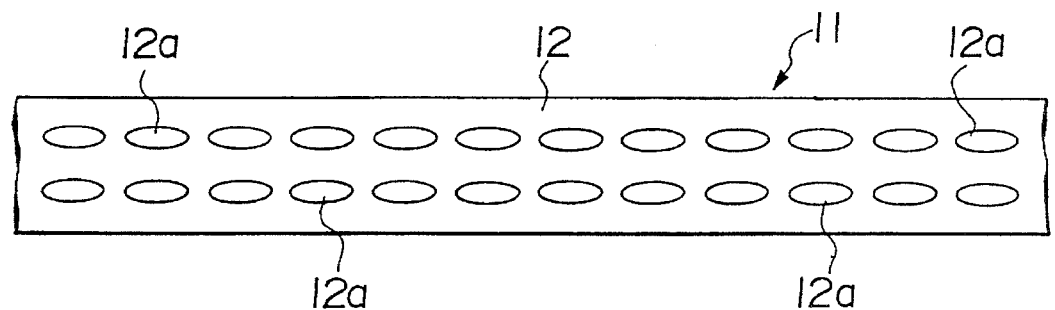
FIG. 5B shows another pattern of the formed hardened layers.

Two circumferential lines of separate partial hardened layers 12a, as shown in FIG. 5B, can also be formed in the inner wall 12 of the cylinder block 11, by transferring the coil assembly 1 along the center axis of the cylinder block 11 vertically and repeating a heat-hardening treatment. Further, two circumferential lines of separate partial hardened layers 12a, as shown in FIG. 5C, can also be formed in staggered fashion in the inner wall 12, by rotating the coil assembly 1 at a predetermined angle on the center axis thereof when transferring it along the center axis of the cylinder block 11 vertically.

Figure 5C:
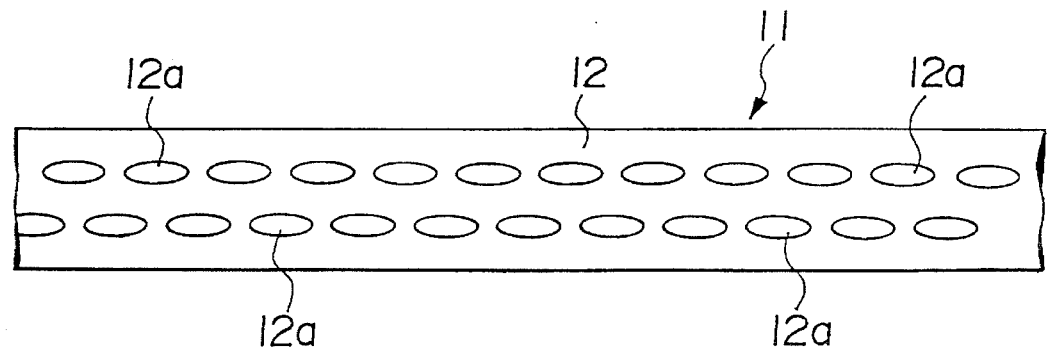
FIG. 5C shows a further pattern of the formed hardened layers.

It is a matter of course that the hardened pattern on the inner wall 12 of the cylinder block 11 to be heated by the coil assembly 1 of the embodiment may have not only two circumferential lines as shown in FIGS. 5B and 5C but three or more circumferential lines of separate partial hardened layers 12a. The spaces between the recess portions 4 formed on the inner wall of the cylindrical conductive member 2 can be optionally changed so long as the formed hardened layers 12a do not overlap each other. Therefore, according to use of the coil assembly 1 according to the embodiment, it is possible easily to respond to clients' requirements of a lot of types of pattern for hardening.

Figure 6:
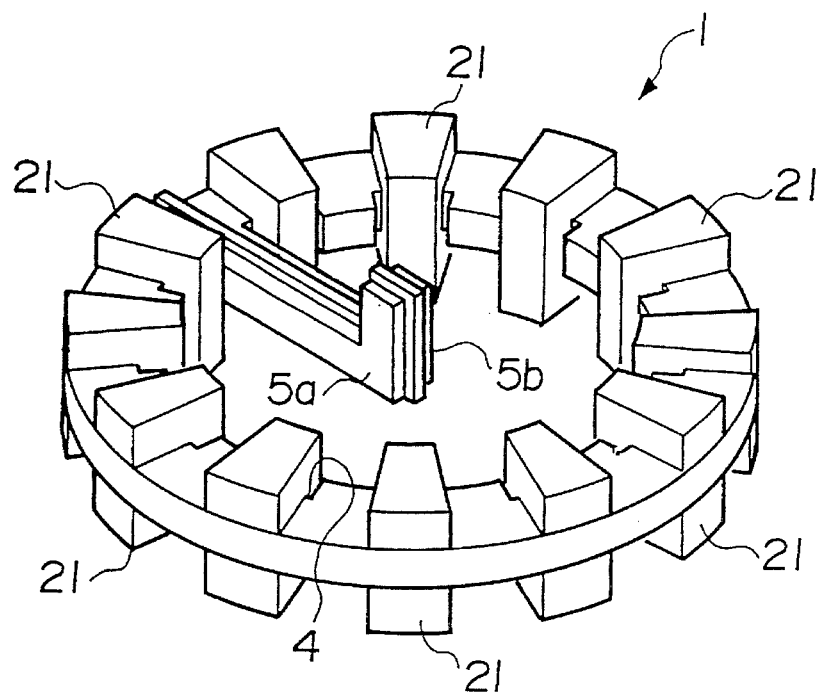
FIG. 6 is a perspective view of the induction heating coil assembly to which a plurality of cores are attached.
Figure 7:
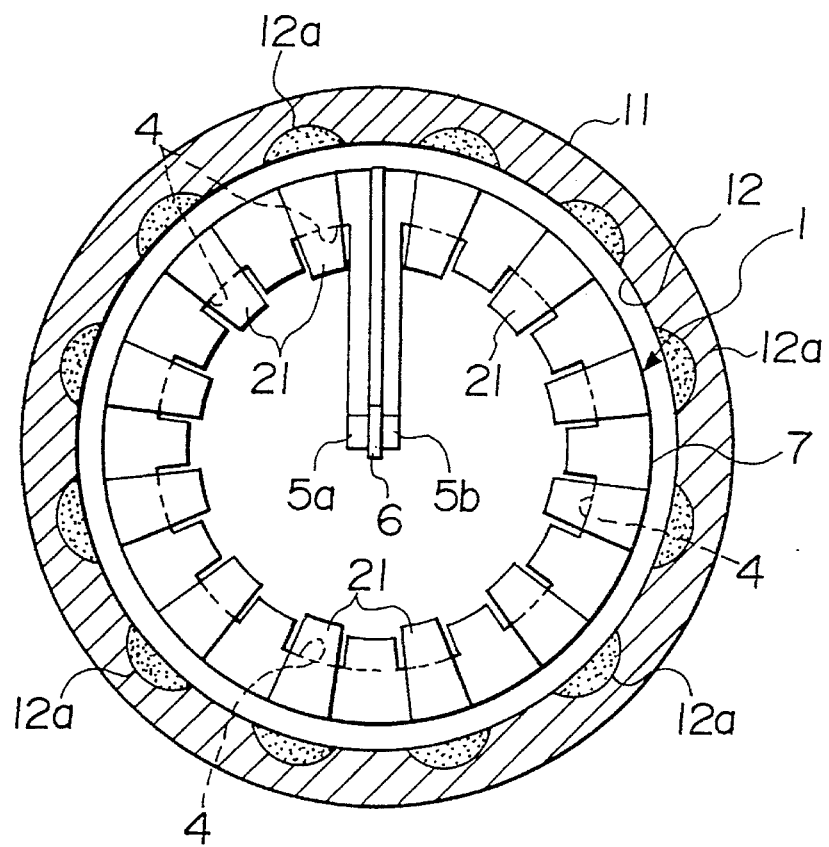
FIG. 7 is a plan view of the induction heating coil assembly outside of which the external cylindrical member to be heated is set at a predetermined uniform space therefrom.

A perspective view of the induction coil assembly 1 having a plurality of recess portions 4, 4, . . . to which a plurality of cores 21, 21, . . . are attached, is shown in FIG. 6. A plan view of the induction coil assembly 1 outside of which the cylinder block 11 to be heated is set, is shown in FIG. 7.

Figure 8:
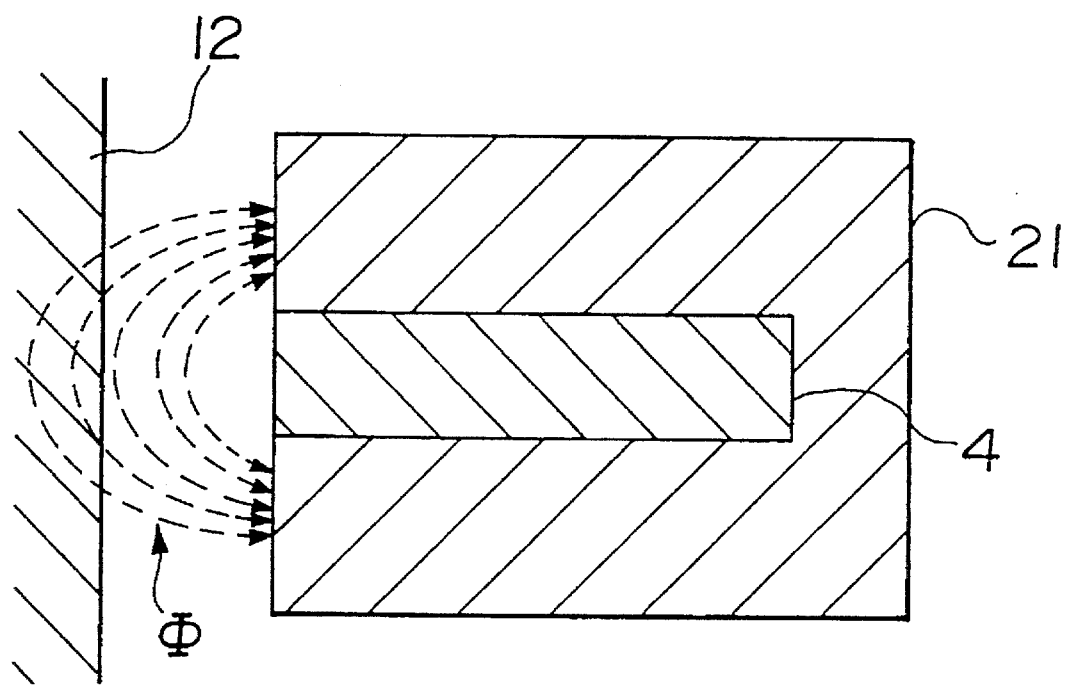
FIG. 8 is a vertical sectional view for explaining a state of alternating magnetic flux Φ generated between the portion of the induction heating coil assembly having a recess portion and the inner wall of the external cylindrical member to be heated in FIG. 7.

The alternating magnetic flux $\Phi$ generated between the portion of the coil assembly 1 having a recess portion 4 and the inner wall 12 of the cylinder block 11 to be heated is apt to be concentrated upon the forward direction by attaching the core 21 to each recess portion 4, as shown in FIG. 8. Consequently, it is possible to form deep separate partial hardened layers 12a in the inner wall 12.

Therefore, it is possible easily to respond to requirements of clients who wish to form separate partial hardened layers which is deeper than that of usual hardened layers, by attaching the cores 21.

When the cores 21 are attached, the heat advance speed is increased. If spaces between the separate partial hardened layers 12a to be formed were too small, adjacent partial hardened layers 12a might connect to each other. In order not to connect the partial hardened layers 12a, it is necessary to provide larger spaces between the recess portions 4 of the cylindrical conductive member 2 with the cores 21 than that of the conductive member 2 with no cores.

As described above, the coil assembly 1 according to the embodiment comprises a cylindrical conductive member 2, the inner wall 3 of which has a plurality of recess portions 4, 4, . . . which make the radial thickness of the conductive member 2 small partially, at predetermined spaces circumferentially. Thus, the structure of the coil assembly 1 is very simple. It is possible to produce the coil assembly 1 at a low cost in comparison with production of a conventional heating coil assembly.

This embodiment enables an easy adjustment to maintain the space between the coil assembly 1 and the inner wall 12 of the cylinder block 11 to be heated constantly, and a heat-treatment simultaneously to form a plurality of separate partial hardened layers at circumferential desired positions on the inner wall of the cylindrical member such as the cylinder block 11.

For example, in a simultaneous heat-hardening treatment of a shaft with a flange, use of the induction heating coil of the embodiment enables an easy adjustment of the depth of the hardened layer, without cores which were used for a conventional induction heating coil.

Further, since the induction coil assembly 1 has one turn construction, it is possible to reduce and control easily the quantities of electric current from an inverter external power supply apparatus, and to reduce the burden of power and control on the power supply apparatus, and thereby to cut cost for a system using the induction heating coil assembly. Therefore, it is also possible to suppress exhaustion of the induction heating coil assembly itself to lengthen life, and to reduce the maintenance costs thereof.

Although certain preferred embodiments of the present invention has been shown and described in detail, it should be understood that various changes and modifications may be made therein without departing from the scope of the appended claims.

For example, in the above embodiments, an application of the induction heating coil assembly of the present invention is applied only for hardening a cylinder block. However, there is no doubt that the induction heating coil assembly of the present invention can be applied for various kinds of cylindrical members which require a hardening treatment in the inner wall thereof. The spaces between the recess portions 4 formed on the inner wall of the coil assembly 1 can be optionally changed so long as the formed hardened layers 12a do not overlap each other.

According to the induction heating coil and the method for hardening an inner surface of a cylinder of the invention, it is possible to divide each circumferential portion to be heated of the inner wall of the cylindrical member into plural parts at desired positions and to heat-treat collectively to form a plurality of separate partial hardened layers. Thereby, it is possible easily to respond to a requirement of a lot of types of pattern for hardening.

Since the induction heating coil according to the invention has a simple structure, it is possible to reduce and control easily the quantities of electric current from a power supply apparatus, and to reduce the burden of power and control on the power supply apparatus, and thereby to cut cost for a system using the induction heating coil. Therefore, it is also possible to suppress exhaustion of the induction heating coil itself to lengthen life, and to reduce the maintenance costs thereof.

What is claimed is:

1. A method of hardening an inner surface of a cylinder by using an induction heating coil assembly which comprises a conductive induction member having a substantially cylindrical shape, for forming a hardened layer in the inner wall of an external cylindrical member to be heated which is provided apart from the conductive induction member, by generating an induced current in the inner wall of the external cylindrical member, wherein a plurality of recess portions are formed on the inner wall of the conductive induction member at predetermined spaces circumferentially; comprising the steps of:

flowing high frequency current through said conductive induction member at a first position thereof with respect to said external cylindrical member, to heat separate portions on a first circumferential line of the inner wall of said external cylindrical member which correspond to the plurality of recess portions of said conductive induction member by generation of induced currents in the inner wall of said external cylindrical member, and thereby to form a plurality of hardened layers at said separate portions on said first circumferential line;

transferring said conductive induction member to a second position with respect to said external cylindrical member along the central axis of said external cylindrical member; and thereafter, flowing high frequency current through said conductive induction member at the second position thereof with respect to said external cylindrical member, to heat separate portions on a second circumferential line of the inner wall of said external cylindrical member which correspond to the plurality of recess portions of said conductive induction member by generation of induced currents in the inner wall of said external cylindrical member, and thereby to form a plurality of hardened layers at said separate portions on the second circumferential line.

2. A method of hardening an inner surface of a cylinder as claimed in claim 1, further comprising a step of rotating said conductive induction member at a predetermined angle after said step of flowing high frequency current at the first position thereof.

3. A method of hardening an inner surface of a cylinder block by using an induction heating coil assembly which comprises a conductive induction member having a substantially cylindrical shape, for forming a hardened layer in the inner wall of the cylinder block which is provided apart from the conductive induction member, by generating an induced current in the inner wall of the cylinder block, wherein a plurality of recess portions are formed on the inner wall of the conductive induction member at predetermined spaces circumferentially; comprising the steps of:

flowing high frequency current through said conductive induction member at a first position thereof with respect to said cylinder block, to heat separate portions on a first circumferential line of the inner wall of said cylinder block which correspond to the plurality of recess portions of said conductive induction member by generation of induced currents in the inner wall of said cylinder block, and thereby to form a plurality of hardened layers at said separate portions on said first circumferential line;

transferring said conductive induction member to a second position with respect to said cylinder block along the central axis of said cylinder block; and thereafter, flowing high frequency current through said conductive induction member at the second position thereof with respect to said cylinder block, to heat separate portions on a second circumferential line of the inner wall of said cylinder block which correspond to the plurality of recess portions of said conductive induction member by generation of induced currents in the inner wall of said cylinder block, and thereby to form a plurality of hardened layers at said separate portions on the second circumferential line.

4. A method of hardening an inner surface of a cylinder block as claimed in claim 3, further comprising a step of rotating said conductive induction member at a predetermined angle after said step of flowing high frequency current at the first position thereof.

5. A method of hardening an inner surface of a cylinder block as claimed in claim 3; wherein said inner wall of the conductive induction member has m recess portions at approximately equal spaces circumferentially, and said steps of transferring said conductive induction member and of flowing high frequency current through said conductive induction member thereafter are repeated n times, so that [m×(n+1)] separate partial hardened layers are formed in the inner wall of said cylinder block.

6. An induction heating coil assembly adapted to form a plurality of separate partially hardened layers in an inner wall of an external cylindrical member, comprising:

a conductive induction member having a substantially cylindrical shape and a plurality of recess portions formed circumferentially on an inner wall of the induction member at predetermined positions; and a pair of power connecting members, connected to the induction member, for connecting the induction member to a power supply, said pair of power connecting members extending toward the center of the induction member;

wherein the separate partially hardened layers are formed by supplying high frequency current to the induction member through the pair of power connecting members to generate induced currents in the inner wall of the external cylindrical member.

7. An induction heating coil assembly as claimed in claim 6, wherein the conductive induction member has a coil construction with one turn.

8. An induction heating coil assembly as claimed in claim 6, wherein an insulating member is sandwiched between the pair of power connecting members.

9. An induction heating coil assembly as claimed in claim 6, wherein the pair of power connecting members have cable connecting portions connectable with a pair of cables for supplying high frequency current from the power supply, said cable connecting portions being positioned substantially at the center of the induction member.

10. An induction heating coil assembly as claimed in claim 6, further comprising a core attached to each recess portion of the induction member so that alternating magnetic flux generated by the induction member is concentrated in a predetermined direction.

11. An induction heating coil assembly as claimed in claim 6, wherein the recess portions are spaced equally apart.

12. An induction heating coil assembly as claimed in claim 6, wherein the induction heating coil assembly is rotatable.

13. An induction heating coil assembly as claimed in claim 6, wherein the conductive induction member has a substantially projectionless outer surface.

14. An induction heating coil assembly as claimed in claim 6, wherein the inner wall of the external cylindrical member is a projectionless cylindrical surface, said induction heating coil assembly being capable of forming a plurality of separate partially hardened layers in the projectionless cylindrical surface.

15. An induction heating coil assembly as claimed in claim 6, wherein magnetic flux generated by supplying high frequency current to the induction member is concentrated around the recess portions of the conductive induction member such that the portions of the inner wall closest to the recess portions are heated more than the other portions of the inner wall.

16. An induction heating coil assembly as claimed in claim 6, wherein the radial wall thickness of the recess portions is greater than zero but less than the radial wall thickness of non-recess portions of the induction member.

* * * * *